United States Patent [19]

Morrill, Jr.

[11] Patent Number: 5,224,261
[45] Date of Patent: * Jul. 6, 1993

[54] METHOD OF MAKING A SUB-MINIATURE ELECTRICAL COMPONENT, PARTICULARLY A FUSE

[75] Inventor: Vaughan Morrill, Jr., St. Louis County, Mo.

[73] Assignee: Morrill Glasstek, Inc., Maryland Heights, Mo.

[*] Notice: The portion of the term of this patent subsequent to Jun. 25, 2008 has been disclaimed.

[21] Appl. No.: 887,099

[22] Filed: May 22, 1992

Related U.S. Application Data

[60] Division of Ser. No. 504,678, Apr. 4, 1990, Pat. No. 5,131,137, which is a continuation-in-part of Ser. No. 492,631, Mar. 13, 1990, Pat. No. 5,097,245, which is a continuation-in-part of Ser. No. 396,561, Aug. 21, 1989, Pat. No. 4,926,543, which is a division of Ser. No. 198,762, May 25, 1988, Pat. No. 4,860,437, which is a division of Ser. No. 5,964, Jan. 22, 1987, Pat. No. 4,749,980.

[51] Int. Cl.⁵ .................. H01H 69/02; C23C 14/34
[52] U.S. Cl. .................................... 29/623; 204/192.15
[58] Field of Search ............... 204/192.15, 192.17; 29/623

[56] References Cited

U.S. PATENT DOCUMENTS

| | | | |
|---|---|---|---|
| 2,864,917 | 12/1958 | Sundt | 337/163 |
| 3,314,873 | 4/1967 | Lunsford | 204/192.21 |
| 3,358,362 | 12/1967 | McElroy | 29/621 |
| 3,401,452 | 9/1968 | Ragan | 29/623 |
| 3,500,276 | 3/1970 | Hingorany et al. | 337/293 |
| 3,564,354 | 2/1971 | Aoki et al. | 357/51 |
| 3,693,128 | 2/1972 | Jacobs | 337/166 |
| 3,735,318 | 5/1973 | Bucklin | 337/296 |
| 3,849,878 | 11/1974 | Rudd et al. | 29/610.1 |
| 3,887,893 | 6/1975 | Brandt et al. | 338/262 |
| 4,016,527 | 4/1977 | Francis et al. | 338/274 |
| 4,087,585 | 5/1978 | Schulz | 337/232 |
| 4,107,759 | 8/1978 | Shirn et al. | 361/275 |
| 4,107,762 | 8/1978 | Shirn et al. | 361/433 |
| 4,140,988 | 2/1979 | Oakes | 337/279 |
| 4,193,106 | 3/1980 | Coleman | 361/275 |
| 4,214,353 | 7/1980 | Kalina | 29/25.42 |
| 4,224,695 | 9/1980 | Dematos et al. | 361/433 |
| 4,337,570 | 7/1982 | Woznica | 29/623 |
| 4,376,927 | 3/1983 | McGalliard | 337/297 |
| 4,433,360 | 2/1984 | Wakino et al. | 361/305 |
| 4,460,888 | 7/1984 | Gratton et al. | 337/290 |
| 4,486,738 | 12/1984 | Sadlo et al. | 29/620 |
| 4,520,338 | 5/1985 | Watainabe | 337/297 |
| 4,532,489 | 7/1985 | Phillips | 337/228 |
| 4,536,270 | 8/1985 | Johnson | 204/192.15 |
| 4,540,969 | 9/1985 | Sugar | 337/332 |
| 4,540,970 | 9/1985 | Kasamatsu | 337/297 |
| 4,541,034 | 9/1985 | Fanning | 361/405 |
| 4,584,629 | 4/1986 | Garcia | 361/321 |
| 4,720,767 | 1/1988 | Chan et al. | 361/275 |
| 4,749,980 | 6/1988 | Morrill et al. | 337/232 |
| 4,757,423 | 7/1988 | Franklin | 361/275 |
| 4,771,260 | 4/1988 | Gurevich | 337/231 |
| 4,814,946 | 3/1989 | Su | 361/523 |
| 4,860,437 | 8/1989 | Morrill et al. | 29/623 |
| 4,873,506 | 10/1989 | Gurevich | 29/623 |
| 4,926,543 | 5/1990 | Morrill et al. | 29/623 |
| 5,001,451 | 3/1991 | Morrill et al. | 337/247 |
| 5,027,101 | 6/1991 | Morrill | 337/297 |
| 5,032,817 | 7/1991 | Morrill et al. | 337/247 |
| 5,040,284 | 8/1991 | Morrill et al. | 29/592.1 |
| 5,097,245 | 3/1992 | Morrill | 337/247 |
| 5,122,774 | 6/1992 | Morrill et al. | 337/246 |

FOREIGN PATENT DOCUMENTS 948894 10/1956 Fed. Rep. of Germany.
3304263 8/1984 Fed. Rep. of Germany.

*Primary Examiner*—Aaron Weisstuch
*Attorney, Agent, or Firm*—Polster, Lieder, Woodruff & Lucchesi

[57] ABSTRACT

An electrical component, particularly a fuse for a surface-mount component, is formed by sputtering an electrical conductor onto a square tube, sleeving the tube into an outer tube, filling the assembly with a room-temperature vulcanizing silicone sealant, cutting the assembly into segments, and metallizing the ends of each segment.

15 Claims, 4 Drawing Sheets

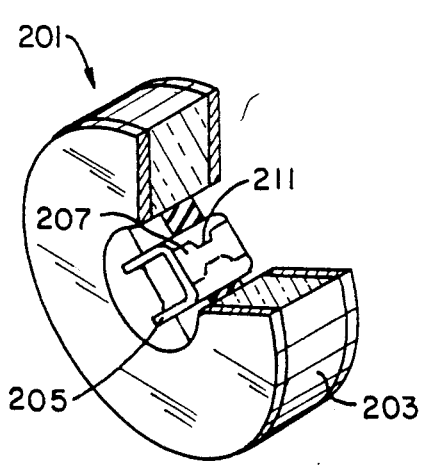
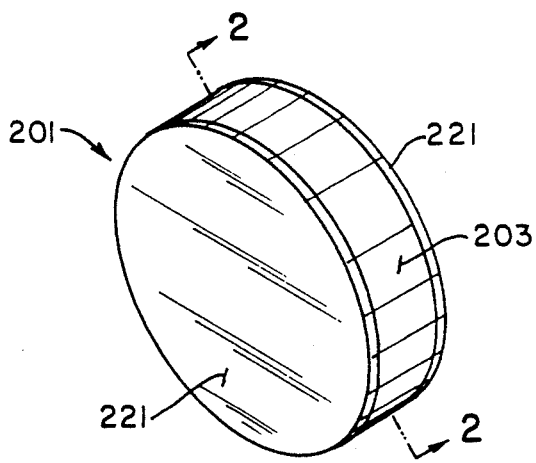
FIG.1.   FIG.1.A.
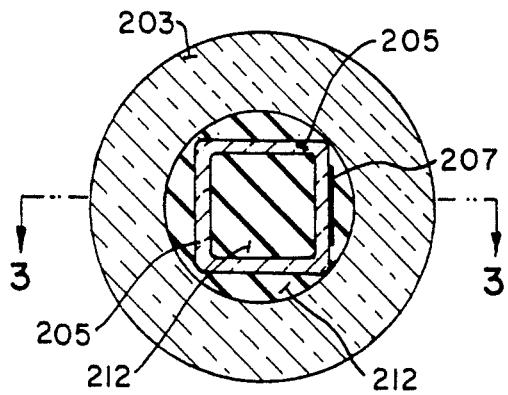
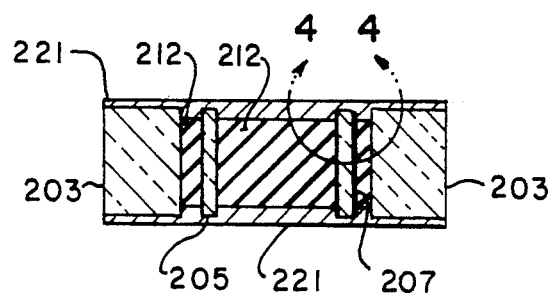
FIG.2.   FIG.3.
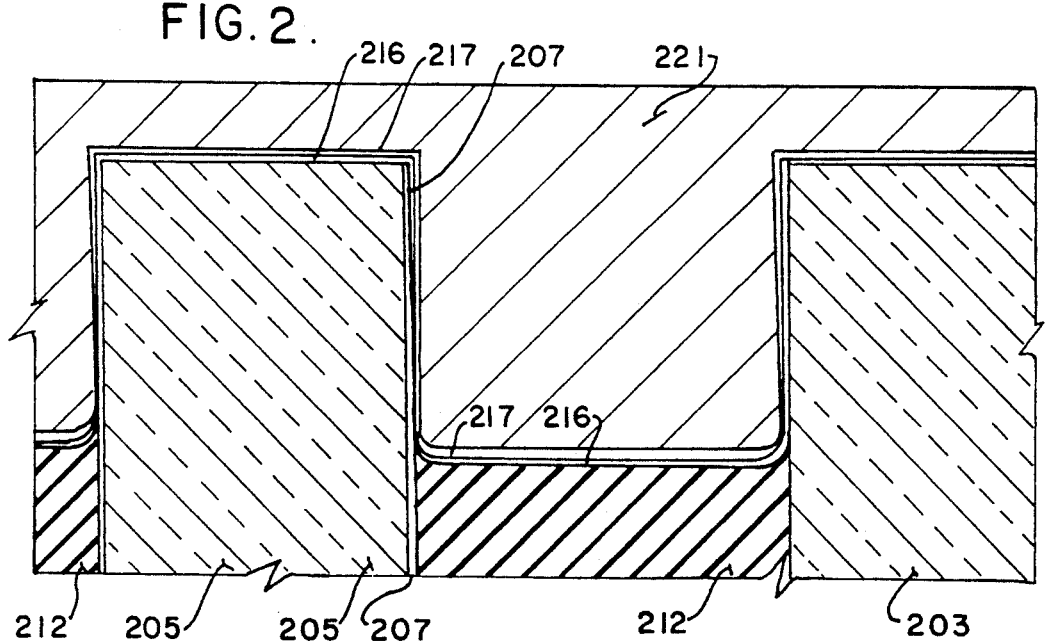
FIG.4.

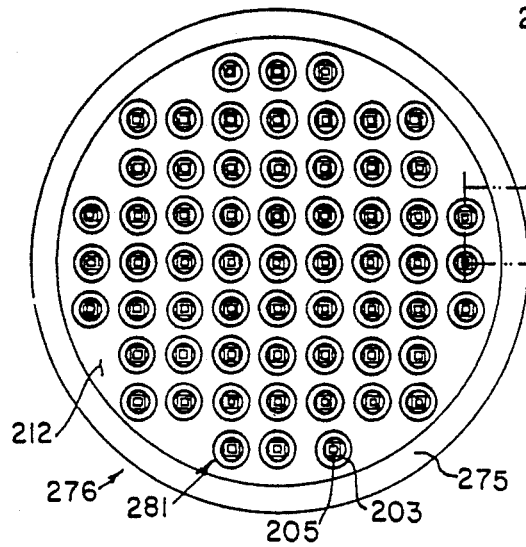
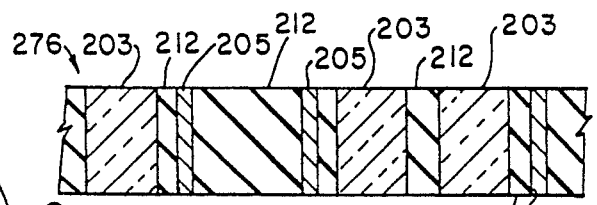
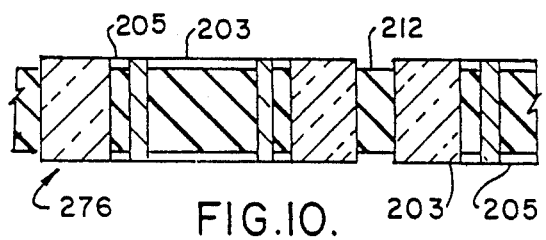
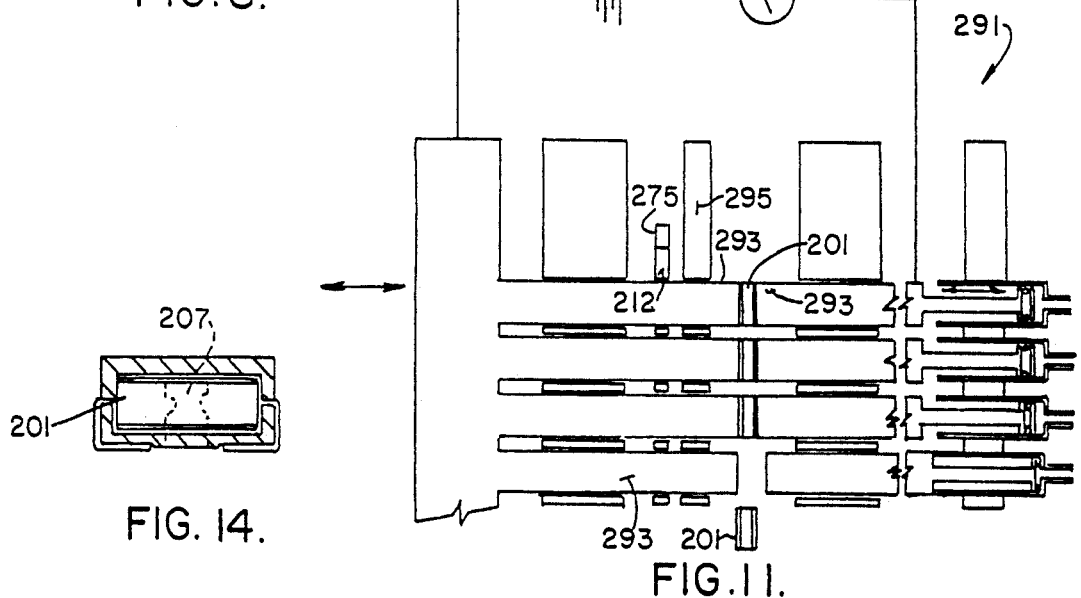
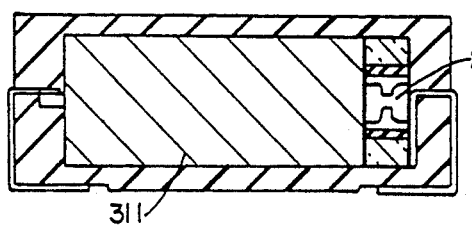
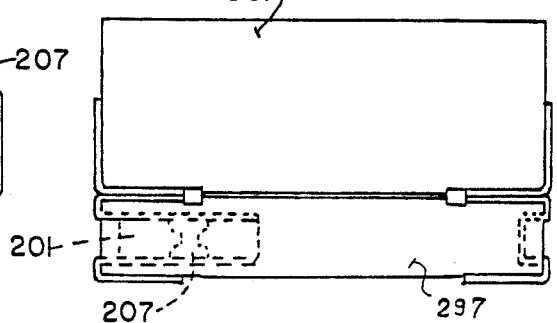

METHOD OF MAKING A SUB-MINIATURE ELECTRICAL COMPONENT, PARTICULARLY A FUSE

CROSS REFERENCE TO RELATED APPLICATIONS this is a division of copending application Ser. No. 504,678, filed on Apr. 4, 1990, now U.S. Pat. No. 3,431,137 which is a continuation-in-part of application Ser. No. 492,631, filed Mar. 13, 1990, now U.S. Pat. No. 5,097,245, which is a continuation-in-part of application Ser. No. 396,561, filed Aug. 21, 1989, now U.S. Pat. No. 4,926,543, which is a division of application Ser. No. 198,762, May 25, 1988, now U.S. Pat. No. 4,860,437, which is a division of application Ser. No. 005,964, Jan. 22, 1987, now U.S. Pat. No. 4,749,980.

BACKGROUND OF THE INVENTION

This invention relates to components and methods of making them. It has particular application to a sub-miniature fuse for electronic components and most particularly for surface mount devices where small size, low energy actuation, low resistance, high frequency signal handling, and high open resistance are desired. As used herein, the term "sub-miniature" indicates a component less than 0.1" on a side in at least two dimensions. The invention will be described in connection with such fuses, but the utility of some aspects of the invention is not limited thereto.

In some of its aspects, the present invention is a modification of the structures and processes described in commonly owned U.S. Pat. No. 4,749,980, the disclosure of which is hereby incorporated by reference.

With the advent of surface mount technology, burning and charring of surface mount boards by runaway components has become much more prevalent. The closer proximity of components, as found on surface mount boards, contributes to this problem along with thinner dielectric materials required to reduce component size. In addition, the area available to conduct away or radiate energy during normal operation or catastrophic failure is reduced.

Large, high component density, surface mount boards may cost thousands of dollars in today's market so that the protection offered by fused components can result in an extreme cost savings over the life of the board or the equipment incorporating such a board. The complete destruction by fire of the equipment or structure in which these components are housed is also prevented by proper fusing at the surface mount board level.

Surface mount monolithic ceramic capacitors, electrolytic (e.g., tantalum) capacitors and power transistors are typical of some of the components that can produce board burning and charring during failure.

A fuse to protect these and similar components from generating destructive temperatures on surface mount boards must be small enough to be incorporated within the housing of the component or externally attachable to the housing so that no additional board real estate or change in component footprint is required.

The fuse must have extreme reliability to be effective and must not be subject to loss in reliability due to complicated and variable manufacturing procedures.

Such a fuse must have the lowest possible impedance, even when operating at high frequencies of 100 MHz or more, so that losses in the fused component are reduced to an absolute minimum.

The fuse must carry a significant current without serious overall increases in impedance to the series-connected component, yet open rapidly with a small increase in current before the component approaches its critical failure temperature. For example, one specification for a fuse for a tantalum capacitor requires that the fuse carry 0.75 amperes D.C. for five seconds but must blow within five seconds on application of 1.4 amperes D.C.

The open fuse must have a very high resistance so that minute residual currents can not flow through the protected component over long periods of time. In the case of tantalum capacitors even the continuous flow of a few microamps can reestablish high temperatures in the failed component, so that a resistance on the order of ten megohms may be required in the open fuse.

Finally, the fuse must be able to be manufactured economically and reliably using high volume techniques such as those found in the semiconductor industry.

U.S. Pat. Nos. 4,107,759 (Shirn et al), 4,107,762 Shirn et al), and 4,193,106 (Coleman) are among the earlier patents that discuss the problems of fuse protection for capacitors. These patents use exothermic wire fuses buried in molded plastic housings in thermal contact with the capacitor. They have proven to be an unreliable solution because of serious thermal variables that can prevent actual exothermic action due to chilling of the wire link. If the exothermic wire does not ignite, the fuse may carry enough current to ignite the tantalum capacitor.

U.S. Pat. No. 4,224,656 (DeMatos et al) is similar to he foregoing patents, but shows a method for isolating the exothermic wire in space to overcome the erratic behavior of exothermic wire molded in plastic.

All of these patents suffer from high manufacturing costs due to difficulties in handling tiny wire, high impedance at high frequencies, and difficulties with termination of the wire to the outside of the package.

The necessary small diameter fuse wire, on the order of one mil, is extremely hard to fabricate into a surface mount package and causes relatively high manufacturing cost because manufacture is not tractable to mass production methods such as found in the semiconductor industry.

The small surface area of small diameter wires impedes high frequency signals which flow only on the surface of a conductor, thereby increasing the high frequency impedance of the fused component. In addition, small diameter wires show significant inductance. The effective series resistance (ESR) of the fuse is therefore generally objectionably high when used in high frequency applications.

The extreme small diameter of the exothermic wire is necessary to bring a short length of it to the exothermic reaction temperature and requires that the fuse have a relatively high D.C. resistance thereby adding to the overall impedance of the fuse component combination.

U.S. Pat. No. 4,757,423 (Franklin) forms a fused tantalum capacitor in another way. This patent utilizes as the fuse link a pad of spherical polystyrene particles coated with about 1% by weight of a metal and molded at high temperature and pressure into plaques, in which the metallic shell continuity is preserved in a continuous polystyrene matrix formed from the coated particles during the molding operation. This approach eliminates the tiny wire problem in a tantalum capacitor fuse, but it introduces new variables that are difficult to control. The overall D.C. resistance and current carrying characteristics of the fuse are so sensitive to the polymer and metal phase ratio in the matrix along with the need for precise control of internal and external geometries that a practical fuse to protect a tantalum capacitor becomes extremely difficult to manufacture.

U.S. Pat. No. 4,749,980 (Morrill et al) discloses a fuse whose link has a large surface area, hence a low D.C. resistance and ESR, but the fuse shows too high a residual resistance for use in an electrolytic capacitor and is difficult to make small enough to be used without enlarging the footprint of, for instance, a standard "D" sized capacitor package.

SUMMARY OF THE INVENTION

One of the objects of this invention is to provide a high-volume, low-cost method for forming electrical components.

Another object is to provide an electrical component of extremely small dimensions, which may be made reliably, reproducibly, inexpensively, automatically, and in large quantities.

Another object of this invention is to provide such a component which may easily be tested during the manufacturing process.

Another object of this invention is to provide such a component which is easily handled and mounted in or on a standard package of another, surface mounted, component.

Another object of this invention is to provide a fuse of the foregoing type.

Another object of this invention is to provide such a fuse which has extremely low D.C. resistance and ESR in normal operation, and which has extremely high residual resistance when the fuse opens.

Another object of this invention is to provide such a fuse which may be accurately and simply modified in its electrical and mechanical characteristics.

Other objects of this invention will be apparent to those skilled in the art in light of the following description and accompanying drawings.

In accordance with one aspect of this invention, generally stated, electrical components are formed by metallizing at least one electrical conductor on the outer surface of a dielectric tube, bonding a curable dielectric jacket to the tube and conductor to protect the conductor, and cutting the tube and jacket into electrical components. Preferably, the jacket is formed by sleeving the metallized glass tube into a sleeve, filling the space between the tube and the sleeve with a curable material, curing the material to bond it to the tube, and cutting at least the tube and the curable material into a plurality of components. Preferably, the cutting step includes cutting the tube, the curable material, and the sleeve.

Preferably, and in accordance with another aspect of the invention, a plurality of assemblies are mounted generally parallel in a fixture, and the space between the assemblies is also filled with the curable material. After the material is cured to form a monolith, it is cut into plates with the individual components held together by the curable material.

Terminals are applied to the individual components while they are held together by the curable material. Preferably, the terminals include a metallized layer applied to an entire broad face of the plate.

In accordance with another aspect of the invention, the components in the plate are initially connected mechanically and electrically. The components are held individually between electrodes, the binding material is stripped from between the components while they are held by the electrodes, and the components are tested before being released.

In the preferred method of the invention, a plurality of square tubes are masked and metallized by vacuum sputtering, the tubes are sleeved, a bundle of sleeved tubes is held in a fixture, the fixture is filled with an RTV silicone and centrifuged to ensure that all air is removed, the silicone is cured, the bundle is cut normal to the axes of the tubes into thin plates, the silicone is etched back to expose a small part of the metallization on the tubes, the plates are metallized by sputtering, individual sleeved components on the plate are supported between two arrays of electrodes, the components are mechanically and electrically separated from each other, the components are electrically tested while being held by the electrodes, and the components are individually released from the electrodes and placed according to how they tested.

The solid filler is preferably a material which fills the space between the tube and the sleeve, as well as the interior of the tube when it is hollow, without leaving any substantial voids. Preferably, it leaves no passages larger than a few microns, and in any event it leaves no passages large enough to provide a metallized path axially through the device during metallization of the ends of the device. A preferred filler is an adhesive material or an elastomeric material, most preferably a material which is both. A particularly useful such material is a silicone elastomer, preferably a two-part, room temperature vulcanizing (RTV) silicone elastomer. The silicone, when cured, clings to the tube and provides a good environmental seal.

The filler is preferably etched back, mechanically or chemically, to expose a short portion of the conductor on the tube, and a contact is applied to the end of the tube, extending across the exposed conductor. Preferably, the contact includes a metallized layer applied across the entire end of the assembly, including the tube, the sleeve and the filler. More generally, the etching back of a filler applied between a cover and a metallized substrate, in order to expose the metallization on the substrate, constitutes another aspect of the invention.

In one embodiment of the invention, the finished components include the sleeve for protection. In that embodiment, the filler bonds the tube to the sleeve. Preferably, the tube is hollow and square. The preferred tube fits snugly within the sleeve. The electrical conductor is metallized, preferably by sputtering, as in the Morrill et al U.S. Pat. No. 4,749,980, on one or more of its flat faces. The tube and the sleeve are preferably both formed of high temperature glass. Because the volume between the tube and the sleeve is filled with an elastomer, the spacing between the tube and sleeve is less critical than in Morrill et al, U.S. Pat. No. 4,749,980.

In another embodiment, the interior of the sleeve is pre-treated to reduce bonding between the sleeve and the filler, and the sleeve is removed along with the matrix of curable material, leaving the metallized tube surrounded by a jacket of curable material which forms a sleeve over the tube. In this embodiment, the jacket of curable material is preferably a circular cylinder over a square tube, with the thickest portion of the cylinder overlying a metal conductor on the tube. In this embodiment, it is also preferred that the tube be a solid rod.

In accordance with another aspect of the invention, the component is a sub-miniature component having a diameter less than 0.1" and having a thickness substantially less than its diameter. In the first embodiment, a filler in the annular space between the tube and sleeve provides a barrier between the ends of the tube. The second embodiment may be even smaller in diameter than the first, and the cured jacket provides a barrier above the electrical conductor on the tube.

In accordance with another aspect of the invention, the component includes a tube, a conductor metallized to an axial face of the tube, a dielectric jacket bonded to the tube and covering a portion of the conductor, the jacket terminating short of at least one end of the tube to expose an end of the conductor adjacent the end of the tube, and metallization covering at least one end of the tube and the exposed conductor. Preferably, the metallization also covers the axial end of the jacket.

In accordance with another aspect of the invention, the component includes a metallized hollow tube and a sleeve, and a dielectric filler filling both the annular space between the tube and sleeve and the inside of the hollow tube.

In accordance with another aspect of the invention, the electrical component is a fuse, and the fuse may be utilized in or on a surface mounted component. The conductor may be made of a metal which reacts with the filler at elevated temperature to provide a chemically augmented fuse. Examples of suitable metals for the link are aluminum and aluminum covered with antimony pentoxide. The size and geometry of the link are easily controlled by masking the flat side of the square tube. Conductors may be sputtered onto more than one side of the square tube, and the link portion of the conductor may be made different in geometry or composition on each side. If desired, other components may be sputtered onto one or more sides of the tube.

In the preferred embodiment, the fuse body is less than 0.10" in diameter and less than 0.05" in length. The ends of the fuse are metallized, and are optionally soldered to provide contacts at the axial ends of the fuse body. The present fuse is much shorter than the fuse illustrated in prior U.S. Pat. No. 4,749,980. If the space between the tube and the sleeve were not filled with a solid filler, the process of metallizing the axial ends of the fuse could create a bridge of material extending axially through the fuse independent of the fuse link. The danger of this occurring is greatly increased by the use of a square tube, which leaves a larger gap between its flat sides and the sleeve, rather than a round tube. The use of an elastomeric or adhesive filler has the further advantage that it eliminates the need for waxing the tube and the sleeve together for cutting them. There is also no wax to be removed, and handling the cut pieces is simplified and made easy to automate.

The use of a square tube, rather than round, makes masking the tube during the metallizing operation much easier and more precise. It also simplifies the metallization of plural conductors running axially of the tube, spaced 90° or 180° circumferentially apart.

Using a single conductor having a 0.010" square link, the fuse of the present invention may have an impedance of 0.1 +/−0.05 ohms over a full range of frequencies from below 0.1 megahertz to over 200 megahertz. A fuse with a somewhat thinner link of the same size has an impedance of under 0.2 ohms, carries 0.75 amps for five seconds, but opens within five seconds when carrying 1.4 amps. When the fuse opens, it exhibits a resistance in excess of 10 megohms, with no tendency to reconnect with time.

The extremely small size of the fuse, its symmetry, and the fact that it is so rugged that it may be handled by conventional automated pick-and-place equipment enable the fuse to be placed within a component package, under the component package, or separately surface mounted with minimal effort.

Other aspects of the invention will become more apparent in light of the following description.

BRIEF DESCRIPTION OF THE DRAWINGS

In the drawings, FIG. 1 is a view in perspective of a fuse of the present invention, partially broken away to show the interior construction.

FIG. 1A is a view in perspective of the fuse of FIG. 1.

FIG. 2 is a sectional view taken along the line 2—2 of FIG. 1A.

FIG. 3 is a sectional view taken along the line 3—3 of FIG. 2.

FIG. 4 is an enlarged view in cross section taken along the line 4—4 of FIG. 3

FIG. 8 is a view in plan of a disk or plate of fuse blanks cut from the bundle of FIG. 7.

FIG. 9 is a sectional view, taken along the line 9—9 of FIG. 8.

FIG. 10 is a sectional view, corresponding to FIG. 9, during a further step in the processing of the plate of fuse blanks, showing the elastomer etched back.

FIG. 11 is a somewhat diagrammatic view of the plate of FIGS. 8-10, after further metallizing steps, held between electrodes of a stripping and testing device.

FIG. 12 is a view in side elevation of the assembled fuse of FIGS. 1-4, assembled under an electrical component.

FIG. 13 is a view in partial cross-section of the assembled fuse of FIGS. 1-4, assembled in a package with an electrolytic capacitor.

FIG. 14 is a view in partial cross-section of the assembled fuse of FIGS. 1-4, assembled in a stand-alone surface-mount package.

DESCRIPTION OF THE PREFERRED EMBODIMENTS

Figure 5:
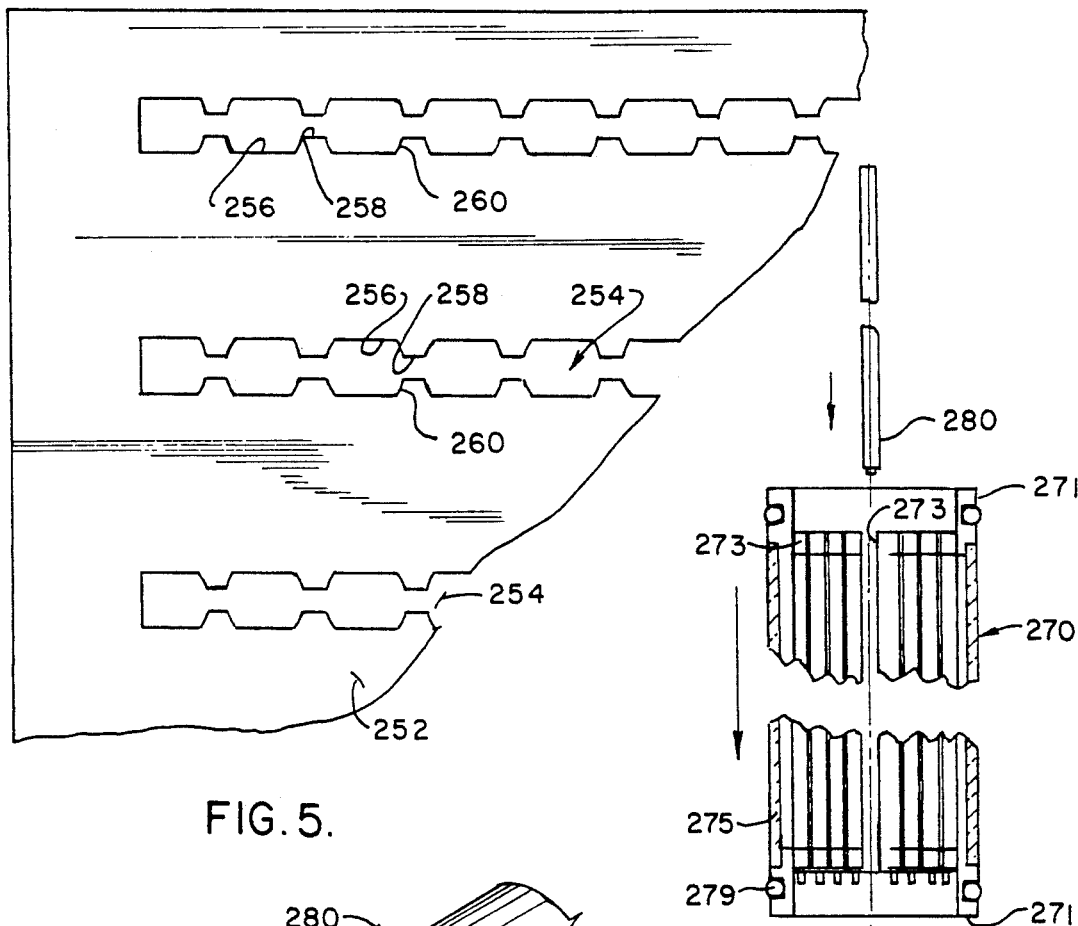
FIG. 5 is a plan view of a mask used for sputtering conductors onto square tubing in the manufacture of the fuse of FIGS. 1-4.

Referring now to the drawings, and in particular to FIGS. 1-4, reference numeral 201 indicates one illustrative embodiment of electrical device of the present invention, particularly a sub-miniature fuse. The fuse 201 includes a dielectric sleeve 203 surrounding a square tube 205. The sleeve 203 and square tube 205 are both formed from high temperature KG-33 borosilicate glass having a softening point above 700° C. The sleeve 203 has an outer diameter of 0.090", a wall thickness of 0.020", an inner diameter of 0.050", and a length of 0.030". The square tube 205 has an outer diagonal diameter of 0.049", an outer face-to-face width of 0.040", a wall thickness of 0.004", and a length of 0.030". The square tube 205 has rounded corners characteristic of the redraw techniques by which it is made.

The square tube 205 has an aluminum film conductor 207 applied to one of its outer faces. The conductor 207 extends axially from end to end of the tube 205. At its center, the conductor 207 is necked down to form a fuse link 211. The link 211 is 0.010" across and 0.010" long. The conductor 207 is two microns thick. The conductor 207 is applied by masking and vacuum sputtering as described hereinafter The dimensions and the composition of the conductor 207 and its link 211 are chosen to provide a fuse suitable for use with a high frequency electrolytic capacitor, for which a fuse is required which will carry 0.75 amps but which will open completely and quickly when carrying an overload current of less than two amps.

The space between the sleeve 203 and square tube 205 is completely filled with a dielectric elastomer 212 as is the interior of the square tube 205. The elastomer 212 terminates 0.003" from the axial ends of sleeve 203 and square tube 205. The elastomer 212 is illustratively a high durometer silicone polymer. A suitable polymer is sold by Dow Corning Corporation under the name Sylgard Q3-6605 thermally conductive elastomer. The cured Q3-6605 elastomer 212 has a Shore A hardness of 80, is stable against reversion, has excellent dielectric properties, and is thermally stable above 200° C.

Each axial end of the fuse 201 is completely covered with a 1.5-micron thick layer 216 of a nickel/vanadium alloy. The nickel/vanadium is a 7% vanadium alloy. The nickel/vanadium layer is intimately bonded to the 0.003" exposed end of the conductor 207, as well as to the axial ends of the sleeve 203, the elastomer 212, and the square tube 205. The nickel/vanadium alloy is in turn covered by a 3-micron thick layer 217 of silver. An electrical contact 221 is applied to each axial end of the fuse 201. The axial contact 221 may be formed of solder or a conductive epoxy. It is preferably about 0.001" thick. A suitable epoxy is a commercially available silver-filled epoxy. A suitable solder is a high temperature solder, for example a commercially available solder made of 95% lead and 5% tin, having a solidus point of 310° C. and a liquidus point of 314° C. In some applications, the metallized layer may itself form the contact.

Referring now to FIGS. 5-11, in an illustrative process of making the fuse 201, sixty-one pieces of high precision KG-33 borosilicate glass tubing 251 are sputtered in a single operation. The lengths of tubing 251 are commercially available square tubing formed by a conventional vacuum redraw process, to give the tubing the cross-sectional shape and dimensions previously described for the inner tube 205. Each length of tubing 251 is 6" long.

The tubing 251 is cleaned and placed in a vacuum sputtering machine using a fill of argon gas at a pressure of about 20 millitorrs with a mechanical mask 252 (FIG. 5) covering all of the tubing 251 except the portions desired to be metallized. The mask 252 includes openings 254 extending axially over each length of tubing 251. Each axial opening 254 includes a series of wide portions 256 connected by restrictions 258. Chamfers 260 at each end of each wide portion 256 provide a smoothing of the transition between the wide portion 256 and the restriction 258. The wide portions 256 are 0.024" wide, and the restrictions 258 are 0.010" wide. Each restriction 258 is 0.010" long, and each wide portion 256 is 0.038" long. Therefore, the repeat length of the wide portions and restrictions is 0.048", and over one hundred twenty repeats may be provided on each tubing length 251. The linear openings 254 are parallel with each other and are spaced 0.100" on centers. Therefore, all sixty-one tubing lengths 251 may be mounted in a fixture which is about 6.5" square.

In accordance with known procedures, a radio frequency sputter etching step is carried out, to remove a few molecules of glass from the surface to be metallized. The masked glass is then exposed to an aluminum target by DC magnetron sputtering for a sufficient time to permit two microns of aluminum to be drawn from the target and deposited on one face of the tubing 251 through the mechanical mask 252. The sputtering process provides a tightly bonded electrical conductor 253 on one flat face of each tubing length 251, running axially of the tubing 251. Each conductor 253 includes wide portions 255 of the same dimensions as the wide portions 256 of the mask 252 and fuse link portions 211 corresponding to the restrictions 258 in the mask 252.

Figure 6:
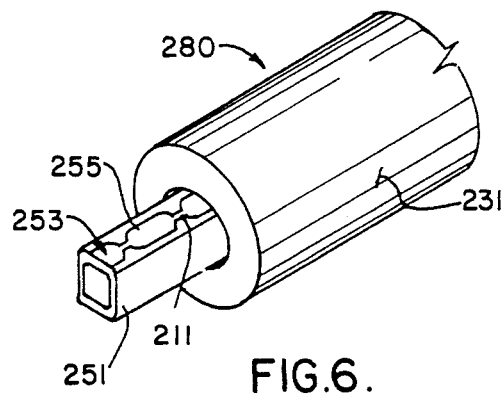
FIG. 6 is a view in perspective of a portion of the square metallized tubing, inserted in an outer tube or sleeve in the production of the fuse of the present invention.

The metallized tubes 251 are removed from the sputtering machine and inserted into six-inch lengths of outer tubing 231, as shown in FIG. 6 to form assemblies 280. The lengths of outer tubing 231, as shown in FIG. 6, are formed of the same borosilicate glass as the inner tubing 251 and have an outer diameter of 0.090" and an inner bore diameter of 0.050".

Figure 7:
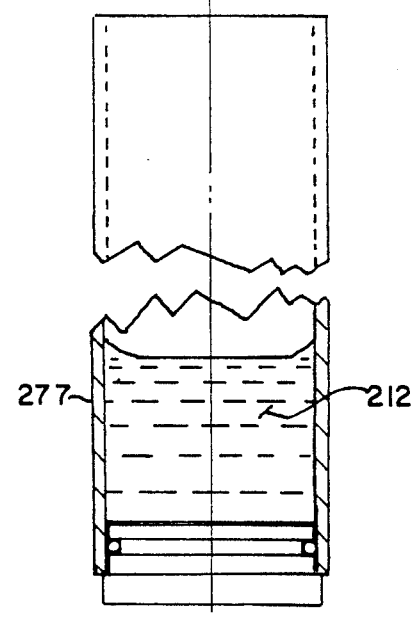
FIG. 7 is a view in elevation, partially diagrammatic and partially cut away, of a bundle of sleeved tubes of FIG. 6, being inserted into a closed-end cylinder for filling with an elastomer.

The sixty-one sleeved tubing assemblies 280 are placed in a carrier fixture 270 as shown in FIG. 7. The fixture 270 has upper and lower caps 271 and a circumferential glass cylinder 275. The caps 271 include counter-bored axial openings 273 through them. The openings 273 position the tube assemblies 280 parallel with each other and spaced 0.010" from each other. The length of the glass cylinder 275 and the diameters and depths of the openings 273 are chosen to permit fluid to flow into and around, the tube assemblies 280 from the axial ends of the fixture 270. The glass cylinder 275 has an inner diameter of about 0.960".

A cup-shaped vessel 277 is partially filled with a pourable, curable elastomer 212. The illustrative Dow Corning Sylgard Q3-6605 elastomer is a two-part liquid silicone elastomer which may be cured at room temperature (RTV) or elevated temperature to form a relatively hard elastomer which supports the sleeved tubing lengths during cutting and which prevents formation of electrical bridges during subsequent sputtering steps and soldering or gluing steps. The two liquid parts of the elastomer system are thoroughly mixed and desired under vacuum in accordance with the manufacturer's instructions, and the mixture is poured into the vessel 277. The loaded fixture 270 is then forced into the vessel 277. 0-rings 279 on the caps 271 prevent the elastomer from extending into the space between the glass cylinder 273 and the side wall of the vessel 277. Forcing the fixture 270 into the vessel 277 causes the liquid elastomer to fill all of the spaces in the cylinder 275, including the inside of the tubing lengths 251, the space between the tubing lengths 231 and 251, and the spaces between outer tubing lengths 231. The vessel 277, carrying the fixture 270, is then centrifuged at two thousand RPM on a twenty-two inch diameter rotor to remove all air and leave a nonporous elastomeric adhesive filling the fixture 270. The elastomer is then cured at 100° C. for 60 minutes to firmly adhere it to the tubing lengths 231 and 251 and to the conductors 253.

After the elastomer 212 has cured, the cylindrical bundle of tubing assemblies 280 in the fixture 270 is removed from the vessel 277 and is cut with a diamond saw into one hundred twenty discs 276, each having a thickness of 0.030", as shown in FIGS. 8 and 9. The cuts are made through the center of each wide portion 255 of the conductors 253, with a kerf of 0.018". Suitable saws are a diamond saw, a wire saw, or a slurry saw, preferably with multiple blades to make all the cuts through the cylindrical bundle simultaneously. Each disc contains sixty-one fuse blanks 281 consisting of a metallized square tube 205 cut from the tubing 251 sleeved within a sleeve 203 cut from the outer tubing 231, and bonded to the sleeve 203 by the elastomer 212.

The discs 276 are cleaned, and a small amount of the silicone elastomer 212 is etched back from each face of the disc, as shown in FIG. 10. Preferably the elastomer is etched chemically by known means, such as with methylene chloride or a mixture of methylene chloride and benzenesulfonic acid containing predominantly methylene chloride. A suitable methylene chloride etchant is sold commercially by Dynaloy, Inc., Hanover, N.J., under the name Dynasolve 210. The etchant dissolves and removes about 0.003" of silicone elastomer from each face of the disc, without appreciably softening the underlying silicone mass. In particular, the etchant exposes about 0.003" at each end of each tube 205 of the wide portion 255 of the conductor 207.

Alternatively, the elastomer may be etched back mechanically from the ends of the conductor 207, either by cutting or by vacuum plasma etching, for example.

The discs 276 are then placed in the vacuum sputtering machine for two-sided DC magnetron sputtering, to place a metallic layer over both faces of the disc simultaneously. First, the nickel vanadium layer 216 is sputtered onto each face, then the silver layer 217 is sputtered over it. Because the silicone elastomer 212 completely fills and seals the space between the tube 205 and the sleeve 203, as well as filling the inside of the tube 205 and the outside of each sleeve 203, no conductive path can be created during the sputtering process between the axial ends of the fuses 201. Because of the much shorter lengths of the fuses 201 than the lengths of the fuses of prior U.S. Pat. No. 4,749,980, and because of the extremely high impedance path which they must offer when they open, the use of a sealant surrounding the tube and sleeve is important during this step to prevent residual conductivity when the fuse blows. It is believed that an opening between the faces of the disc 276 as small as several microns may be sufficient to permit the formation of a conductive path through the sealant.

The fact that the sealant 212 has been etched away from the axial face of the conductor 207 is also important in assuring good electrical conductivity between the conductor 207 and the metallic layers 216 and 217, even after extreme thermal cycling of the fuse 201. A contact made only with the thin axial end of the conductor 207 is likely to break during normal operation of the fuse because of thermal expansion of the parts, particularly the silicone elastomer. Failure of the fuse at a point other than the link 211 is undesirable not only for the inconvenience caused by disrupting the circuit, but also because the failure is liable to lead to a relatively low resistance path which can draw enough current to ignite the electrolytic capacitor it is supposed to protect.

The faces of the disc 276 are then preferably coated with a 0.001" layer of a conductive material, such as a solder or a conductive epoxy, to form a more substantial contact on each face of the disc.

As shown in FIG. 11, the discs 276 are then individually placed in a testing device 291 having sixty-one pairs of opposed electrodes 293 corresponding in diameter and position to the sixty-one fuses 201 in each disc. The fuses are trapped between the electrodes 293, and a stripping form 295, in the form of a perforated plate, is forced along the electrodes 293 to strip away the excess silicone elastomer 212 from between the fuses 201, together with the metallized coating on the excess elastomer 212. The fuses are thereupon isolated mechanically and electrically from each other, and are individually supported between pairs of electrodes 293. Each fuse is then tested by running a current through its electrodes and its electrical characteristics are noted electronically. The fuses 201 are then individually released into a reject pile if they do not meet electrical specifications, or onto a tape for transfer to a pick-and-place surface-mount machine if they do meet specifications.

The illustrative fuse described has an operating impedance of under 0.2 ohms over a full range of frequencies up to and exceeding two hundred megahertz, carries 0.75 amps for five seconds, but opens within five seconds when carrying 1.4 amps. When the fuse opens, it exhibits a resistance in excess of ten megohms, with no tendency to reconnect with time. When the fuse is exposed to overcurrent conditions, the link 211 appears to react chemically with the silicone elastomer, and forms a cavity within the elastomer 212 which acts to disperse any residual metal conductive particles resulting from the melting of the fuse link. The combined effects of these actions give the open fuse its high resistance after activation.

The fuse 201, when molded into a separate package 297, may be mounted under a surface-mount component such as an electrolytic tantalum capacitor 301, as shown in FIG. 12. This mounting of the fuse 201 as a separate component does not generally raise the capacitor 301 too far above the surface of the surface mount board and therefore takes up no additional real estate on the board. Because the conductor 207 extends across the short dimension of the fuse 201, between the broad faces of the fuse 201, making electrical connection to the fuse is simplified.

As shown in FIG. 13, the fuse 201 may also be formed within a standard "D" package of an electrolytic tantalum capacitor 311, without changing the length of the package. Mounted thus, the fuse 201 is invisible to the user. Again the round cylindrical shape of the fuse 201, and the fact that its terminals are constituted by its flat faces, make mounting the fuse particularly simple. By contrast, some prior art flat fuses require proper orientation and alignment of the fuse with respect to the component in order to make proper contact with the component.

As shown in FIG. 14, the fuse 201 may also be mounted as a separate, stand-alone surface-mount component on a printed circuit board.

Figure 15:
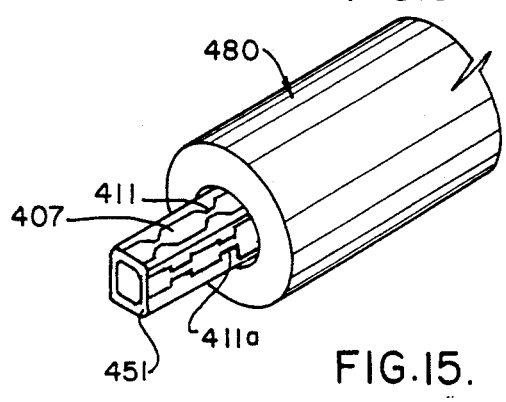
FIG. 15 is a view in perspective corresponding to FIG. 6, of another embodiment of the invention, utilizing tubing having conductors metallized on more than one face.

In FIG. 15, the fuse assembly 480 differs from the assembly 280 of the first embodiment in that separate conductors 407 may be provided on each face of the square tube 451, each with a fuse link 411 and 411a, respectively, designed to carry a different amount of current. Thus, when the assembly 480 is cut into individual fuses, the links open sequentially in cascade when exposed to an overcurrent condition, but carry current with less ESR during normal operation.

Figure 16:
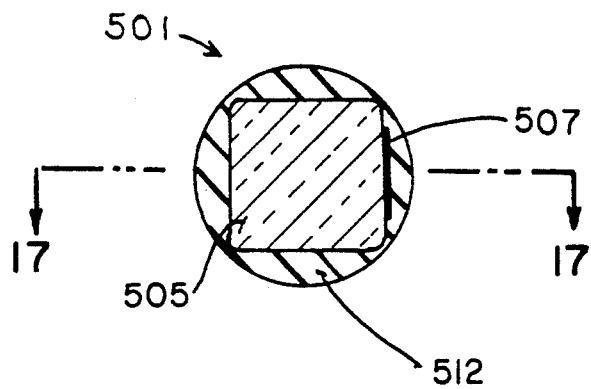
FIG. 16 is a sectional view, corresponding to FIG. 2, of another embodiment of the invention, in which an outer sleeve portion has been removed.
Figure 17:
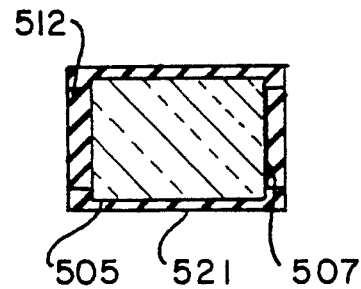
FIG. 17 is a sectional view, corresponding to FIG. 3, of the fuse of FIG. 16.

A much smaller fuse 501 is shown in FIGS. 16–17. This fuse has the same thickness (0.03") as the fuse 201 of the first embodiment, but it has a diameter of 0.05". It may therefore be incorporated in components having a smaller package size than a standard "D" size, for instance "C" and "B" sizes.

Figure 18:
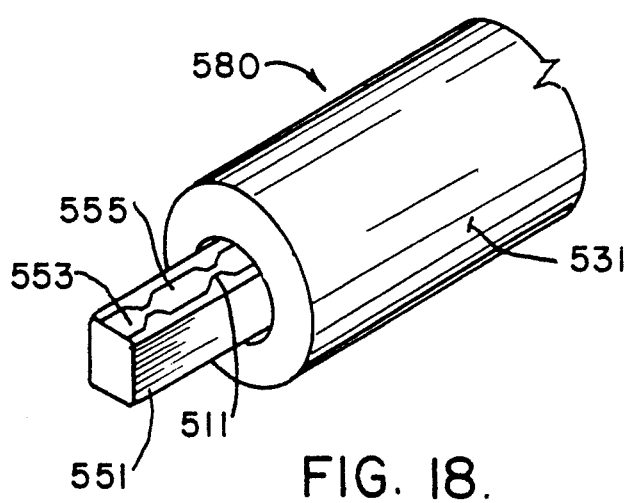
FIG. 18 is a view in perspective, corresponding to FIG. 6, showing a step in the manufacture of the fuse of FIGS. 16 and 17.

The fuse 501 is formed by modifying the method previously described. In this method, as shown in FIG. 18, tubing 551, corresponding in composition and outer dimensions to tubing 251, is in the form of a solid rod. The tubing 551 is metallized in precisely the same manner as in the first embodiment to form a conductor 553 having links 511. Sleeving 531, identical with the sleeving 231, is pretreated by filling it with 1,1,1,3,3,3-hexamethyldisilazane, $(CH_3)_3SiNHSi(CH_3)_3$, for a short period of time, to reduce adhesion between the inside of the sleeving 531 and a silicone filler. The pretreated sleeving is then washed with ethanol, in accordance with known techniques, and dried. The metallized tubing lengths 551 are sleeved in the pretreated sleeving 531, and the assemblies are placed in the same fixture 270 as utilized in the first embodiment. In this embodiment, the preferred silicone 512 is a two-part liquid silicone elastomer sold by Dow Corning Corporation under the name Sylgard-577 elastomer. The cured Sylgard-577 elastomer 512 has a Shore A hardness of 60–65, is stable against reversion, has excellent dielectric properties, and is thermally stable above 200° C. It differs from the Sylgard Q-6605 elastomer of the first embodiment primarily in that it lacks the aluminum oxide loading and is thus less thermally conductive. A more complete description of this material is found in Schulz, U.S. Pat. No. 4,087,585.

After the silicone elastomer has been cured, the assemblies 580 and their silicone support matrix are sawed into disks, the silicone is etched back, and both faces of the disks are metallized to form contacts 521, all in the same way as in the first embodiment. The metallized disks are placed in a separating and testing machine identical with the the machine 291, except that the diameters of the electrodes 293 are smaller, and the openings in the stripping form 295 are 0.050" in diameter. Therefore, the segments of sleeving 531 are held in the silicone matrix, leaving only the metallized tubes 505 and the silicone elastomer 512, with their metallized ends 521, forming the fuses 501. The pretreatment of the sleeving 531 permits the silicone jacket 512 to be stripped cleanly from the sleeving segments. The silicone jacket 512, however, clings tenaciously to the tube 505 and its metallized conductor 507. Moreover, the jacket 512 is thickest over the center of each face of the tube 505, directly over the conductor 507 and particularly its link 511, which are centered on one face of the tube 505. Therefore, the jacket 512 provides protection for the link even when the fuse is handled by its axial face above the link 511. The jacket 512 also shields the link from any contact with the various plastic molding compounds used to package components for mounting on circuit boards. This shielding prevents any arcs that may form during or after overcurrent conditions, when the fuse link opens, from carbonizing the ambient plastic molding material and making a carbon trace conductive path. As in the first embodiment, the silicone sealant also appears to react with the link when it melts, and disperses its remnants sufficiently to provide over ten megohms residual resistance even after long periods.

Numerous variations in the electrical component of the present invention, and in the construction method of the present invention, within the scope of the appended claims will occur to those skilled in the art in light of the foregoing disclosure. The geometries, sizes, and relative proportions of the inner tube, the outer sleeve, the conductor, the fusible element, and the sealant, as well as their chemical composition, may be changed to suit the application.

The characteristics of the fuse of the present invention may be varied by controlling the variables which are known to change the sensitivity of the fuse to blow with a given current passing through the link. The most obvious, and easiest to control, is the cross-section of the link. For a given cross-section, the sensitivity of the fuse depends on the melting point of the link material, the heat sinking and thermal conductivity of the materials in the area of the link and in the fuse package itself, and the distribution of the surface area of the link.

To eliminate as much resistance in the wide portions 255 as possible, so that current needed to blow the fuse is concentrated in the link area 211, it may be desirable to sputter deposit the link portions as a narrow continuous strip in a first step, then deposit the wide portions as discrete pads in a second step. Although this approach requires two masks and two sputtering steps, it permits the link portion to be thinner than, or of a different composition from, the wide portions of the conductor.

The tube and sleeve may be made of ceramic. The tube may have a very thin wall on the order of 0.002" thick, and the hollow tube may be left unsupported inside, so that the reaction of the link with the filler blows a hole in the tube, to provide an even more complete break in the conductor. Because the present design does not require a tight fit between the inner tube and its sleeve, the tube may be made in different shapes.

The fusible element of the conductor may be covered with a material with which it reacts at elevated temperatures, such as antimony pentoxide over the preferred aluminum link. The link may be formed of a different conductive material, such as a zinc/aluminum alloy which has a lower melting point, to lower the current at which it blows. The link may be made thicker or broader to carry more current without opening, or it may be made still thinner to carry less current.

The solid sealant between the inner tube and its sleeve may be made of different materials, so long as they meet the other criteria for the product and the method of making it. For example, for some of the methods of the invention, it is important that the sealant support the glass during cutting; this requires a relatively rigid material. For some purposes, a softer, less thermally conductive material may be desirable and usable. For other aspects of the methods of the invention, it is important that the sealant have no passages through it and that it adhere sufficiently to the tube and sleeve to prevent metal from forming a bridge through the fuse during sputtering of the terminals. For other aspects of the operation of the fuse, the sealant should react with the fuse link at elevated temperatures in order to chemically augment the blowing of the fuse link and disperse the link material. For this purpose, for example, a fuse link of tungsten, with a fill of silver chloride provides a highly desirable fuse. The silver chloride may be etched back with sodium thiosulfate ("hypo"). That design, however, permits the link to reestablish itself with time and an applied voltage, and its reestablishment may not be desirable in many applications.

The embodiment of the component having only a curable jacket, without a separate glass sleeve, in particular, may be made by other methods, although the preferred method has many advantages. For example, extrusion or dipping may be utilized to cover at least a portion of the conductor; in the fuse embodiment, the link is the critical portion to cover. The portion of the conductor at the end of the tube may be exposed by masking, photoresist, or other methods.

The term "metallizing" is used broadly to indicate any method of adhering a thin, flat conductor to the dielectric tube.

The electrical component is preferably a fuse, but may be another electrical component. The configuration of the component provides a good contact with the internal conductor and a component of a shape and sturdiness which make handling it easy to automate. If desired, the metallized termination may be provided at only one end of the tube and sleeve, and another treatment provided at the other. The method of making the preferred fuse is also usable in making other components.

These variations are merely illustrative.

I claim:

1. A method of forming electrical fuses, comprising a step of sputtering at least one aluminum conductor on a substrate, the conductor including a link part of reduced cross section, and thereafter a step of adhering a dielectric silicon adhesive to the substrate and the link part of the conductor.

2. The method of claim 1 wherein the aluminum conductor is an aluminum alloy.

3. The method of claim 1 wherein said step of adhering a dielectric silicone adhesive comprises adhering the silicone adhesive to the entire aluminum conductor.

4. The method of claim 3 including a step of etching back a portion of the silicone adhesive to expose a portion of the conductor.

5. The method of claim 4 including a step of sputtering a terminal over the exposed portion of the conductor.

6. The method of claim 1 wherein the substrate is glass.

7. The method of claim 6 wherein the glass substrate has a melting temperature in excess of 700° C.

8. A method of forming electrical fuses, comprising a step of sputtering an electrical conductor on a substrate, the conductor including a fusible link part, and thereafter a step of adhering a dielectric synthetic polymer adhesive to the substrate and the link part of the conductor.

9. The method of claim 8 wherein the step of sputtering a conductor comprises sputtering a conductor of aluminum or aluminum alloy.

10. The method of claim 8 wherein the step of sputtering a conductor comprises forming a link part of reduced cross section in said conductor.

11. The method of claim 8 wherein the adhesive is a silicone material.

12. The method of claim 8 wherein said step of adhering a dielectric adhesive comprises adhering the adhesive to the entire conductor.

13. The method of claim 12 including a step of etching back a portion of the adhesive to expose a portion of the conductor.

14. The method of claim 13 including a step of sputtering a terminal over the exposed portion of the conductor.

15. The method of claim 8 wherein the substrate is glass.

* * * * *